June 26, 1934.  C. R. ROGERS  1,964,533
TRACK TRACTOR SHOE
Filed Oct. 14, 1932
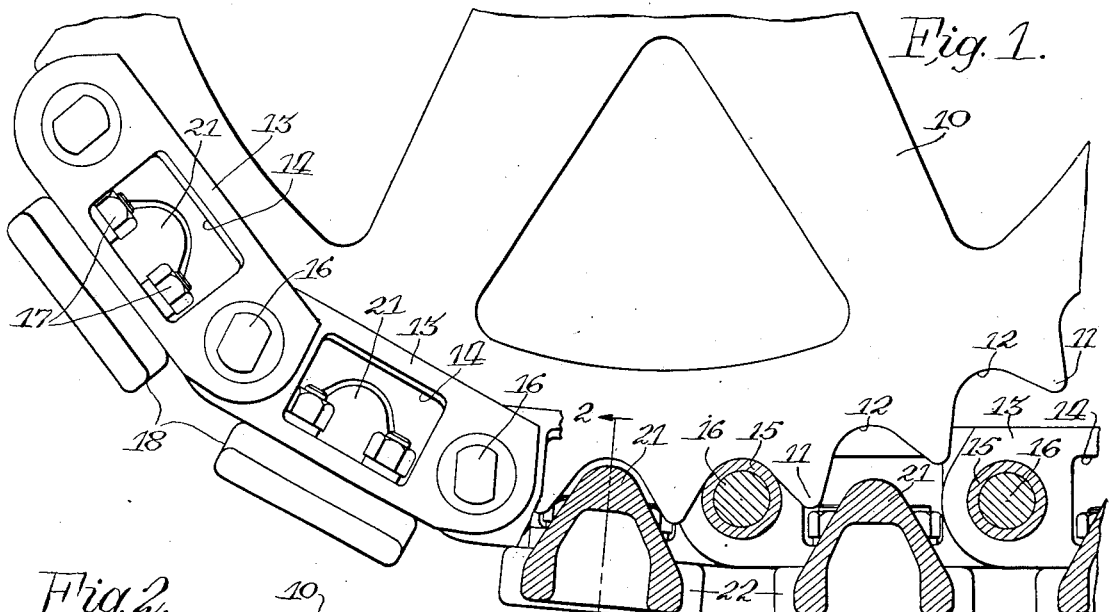
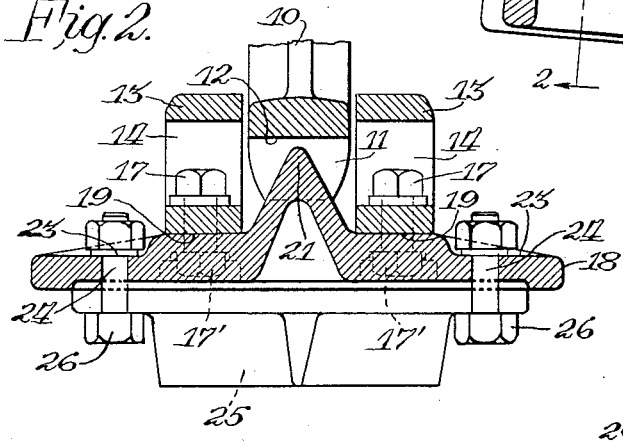
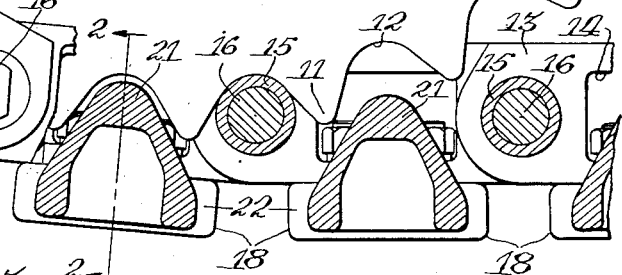
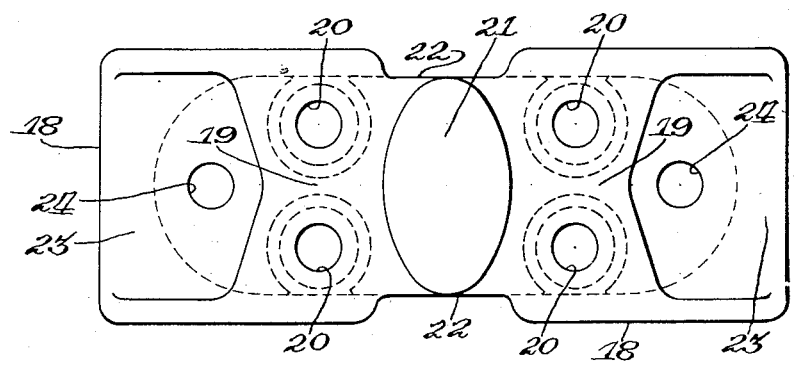
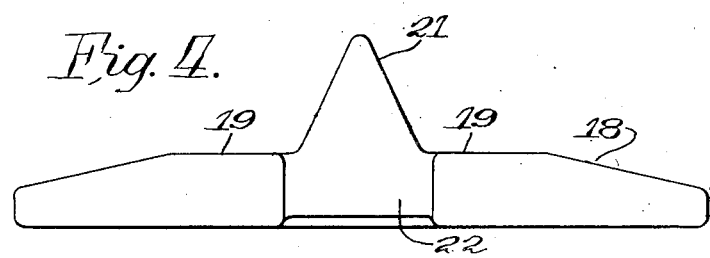
Inventor
Clifford R. Rogers Patented June 26, 1934

1,964,533

UNITED STATES PATENT OFFICE 1,964,533

TRACK TRACTOR SHOE

Clifford R. Rogers, Oak Park, Ill., assignor to International Harvester Company, a corporation of New Jersey Application October 14, 1932, Serial No. 637,750

6 Claims. (Cl. 305—10)

The invention relates to an improved tread shoe construction for track links used in the endless traction belts of self-laying track tractors.

As is well known in this art, a pair of these links or side bars of the belt or chain is spaced laterally apart and has a shoe or traction plate bolted along one edge, and spanning the links to form a pocket into which the teeth of the driving sprocket wheel play to engage sleeves surrounding driving pins that pivotally connect adjoining pairs of links together. Thus is formed a pocket in the link which, when in field work, quickly packs with mud or dirt; and, in snow and ice, quickly packs therewith, all to the detriment of the chain. In fact, frequently the chain is broken under such conditions. This problem arose early in the art and accordingly many years ago designers placed a lateral opening in the links or side bars, to allow dirt to escape laterally out of the chain as the teeth of the sprocket wheel entered the link pocket with a wedging action that extruded the dirt laterally out of the link opening in the manner stated. Providing an opening through the links had the further important advantage of lightening the link to save metal and thereby reduce the cost thereof. In operating these tracks in snow or ice, it is found that this material, due to freezing, is not satisfactorily extruded from the link pockets by the sprocket wheel teeth.

More particularly, then, the invention relates to an improved cleaning mechanism for these tracks when operating especially in snow and ice.

The principal object of the invention, therefore, is to provide an improved endless track that will work satisfactorily in snow and ice conditions.

This, and other objects which will become apparent as the disclosure is more fully made, are achieved by the illustrative example of the invention shown in the accompanying sheet of drawing, in which, briefly, the links are open through their sides in the conventional manner, with an improved form of track plate or tread shoe bolted thereto and transversely across a pair of such links to connect them together, said tread plate shoe being provided midway between its ends and on its inner face with a projecting conical or V-shaped lug. This lug fits into the link pocket and cooperates with the sprocket wheel teeth to wedge out packed snow and ice through the open side links, said lug being so arranged that, as the track wraps around the driving sprocket wheel in operation, the point of the lug nests into the root line tooth space between the sprocket teeth. These tread plates are substantially flat on their ground engaging faces, but in extreme conditions such surfaces may not afford sufficient traction, or overcome slippage, and accordingly the ends of these plates overhang the side bars and are provided with bolt holes to permit easy attachment of an ice grouser to the plate.

In the drawing:

Figure 1 is a fragmentary, side elevational view of a driving sprocket wheel and the endless track chain in engagement therewith, parts of the chain appearing in section;

Figure 2 is a vertical, cross-sectional view through the track, as seen along the line 2—2, appearing in Figure 1, and looking in the direction of the arrows;

Figure 3 is a plan view of the inner face of the shoe or tread plate; and,

Figure 4 is a side elevational view thereof.

The driving sprocket wheel for a track-type tractor appears at 10, the same provided with the usual driving teeth 11, between adjoining ones of which are the gullets or tooth spaces 12.

The endless track chain is made of the usual series of parallel, pivotally connected link sections, each comprising a pair of spaced side links 13 having openings 14 through their sides. At one end, the pair of links is provided with transversely aligned holes to receive a bushing or bearing sleeve 15, drive fitted or otherwise held against rotation in the links; while at their opposite proximate ends the links are provided with other aligned holes to receive a pin 16 suitably held against turning in the links. These links overlap adjoining links and, by means of the pins and sleeves, are pivotally connected together in the well known manner, so that the pin fixed in one end of a pair of links passes through and turns in the bushing sleeve fixed in the ends of a pair of adjoining links. The ground engaging run of each link at the opening 14 is provided with a pair of spaced holes to receive bolts 17 to be utilized in spanning the ground edge of each pair of links with the improved tread shoe plate 18 now specifically to be described.

As shown best in Figures 3 and 4, this shoe is in the form of a substantially rectangular, cast plate having on its inner face a pair of parallel, flat shoulders 19 spaced apart the same distance as a pair of side links 13, said shoulders each formed with a pair of bolt holes 20 extending through the plate. Midway between the ends of the plate, and between the parallel rows of bolt holes 20, the plate is bulged upwardly (radially inwardly when in place in the track relative to the sprocket wheel 10) to form a raised lug 21 of V-cross-section, as shown in Figure 2, the projecting lug being elliptic at its base and then, after the fashion of a cone, tapering off toward its apex to form a blunt point. The opposite marginal edges of the plate, midway between its ends and off-edge relative to the base of the projection or lug 21, are cut away or indented, as shown at 22. Outwardly of the holes 20 toward the ends of the plate, the inner face thereof is formed (at each end) with a flat surfaced depression or pocket 23, each pocket having a bolt hole 24 extending through the plate 18.

This shoe or tread plate in assembled position is mounted with its lengthwise axis crosswise or transversely across the groundward edges of a pair of side links 13, in the manner best shown in Figure 2, so that the shoulders 19 lie flatly against said edges of the links, with the bolt holes in the link registering with the holes 20 in the plate, whereupon the bolts 17 are passed through and the nuts thereof drawn tight, securely to fasten the plate 18 to the links, to form a complete link assembly. In this assembled position of the parts, as the chain wraps around the sprocket wheel 10, the teeth 11 of the wheel project into the pocket formed between the links 13 to wedge out through the openings 14 in the links 13 any snow or ice accumulations which may have formed in said link pockets, the lug 21 nesting into the tooth angle spaces 12 to keep the gullets of the sprocket teeth clean. The lug 21 being conical causes the snow and ice to slough off on the entire rounded surface thereof, forcing the accumulations out through the open sides 14 in the transverse direction, and in a fore and aft direction off the indented marginal portions 22. These latter snow and ice extrusions fall down between the links 13 and out past the sleeves 15 in an obvious manner.

The outer flat surface of the plate 18 serves as a tread plate and flatly engages the ground, as nuts 17' are countersunk, as shown in Figure 2. If, however, such flat traction surface does not afford sufficient traction and slides too easily on ice, for example, then an ice grouser plate 25, indicated in Figure 2, may be bolted quickly by bolts 26 to the ends of the plate 18, said bolts being received in the holes 24 heretofore described.

Thus is provided a snow shoe that may be substituted quickly for the field shoe commonly employed, said snow shoe embodying a cleaning lug cooperating with the sprocket gullets and open sided links to clean the link pockets to keep the chain clean and operative. Also the snow shoe is adapted to receive, in a simple manner, an ice grouser attachment to effect better traction on ice.

From this disclosure it is now apparent that a simple, cleaning lug track shoe has been provided, which achieves all of the objects recited, and that the same is simple and easily usable with standard track links now in common use.

It is the intention to cover all changes and modifications not departing from the spirit and scope of the invention as indicated by the definitions thereof constituting the appended claims.

What is claimed is:

1. A track tractor shoe bolted transversely across a pair of longitudinal links spaced in substantial parallelism, said links being of the open side type connected by sprocket wheel engaging portions, said shoe comprising a plate having a lug on its inner face adapted to project inwardly between the links, said lug having sloped sides adapted to direct foreign matter through the open sides of the links which may be forced between the links by a sprocket wheel.

2. A track tractor shoe bolted transversely across a pair of longitudinal links spaced in substantial parallelism, said links being of the open side type connected by sprocket wheel engaging portions, said shoe comprising a substantially rectangular plate having a cone shaped lug on its inner face projecting inwardly between the links, the inclined sides of said lug adapted to direct through the open sides of the links accumulations which may be forced between the links by a sprocket wheel.

3. A track tractor shoe bolted transversely across a pair of longitudinal links spaced in substantial parallelism, said links being of the open side type connected by sprocket wheel engaging portions, said shoe comprising an elongated plate having a pair of spaced flattened parallel shoulders on its inner face, bolts passed through said shoulders to secure the plate to the links, a cone shaped lug on its inner face between the shoulders, the inclined sides of said lug adapted to direct through the open sides of the links accumulations which may be forced between the links by a sprocket wheel.

4. A track tractor shoe bolted transversely across a pair of longitudinal links spaced in substantial parallelism, said links being of the open side type connected by sprocket wheel engaging portions, said shoe comprising a substantially rectangular plate having ends extended transversely of the links and provided with a cone shaped lug on its inner face located between the links, the inclined sides of said lug adapted to direct through the open sides of the links accumulations which may be forced between the links by a sprocket wheel, and cut-out portions formed on opposite sides of the plate adjacent the lug.

5. The combination with a traction chain for tractors formed by two series of longitudinally extending generally parallel pivotally connected links connected by transverse members, said links arranged in pairs and having openings transversely therethrough, a sprocket wheel to engage the transverse members to drive the chain and force foreign matter through said openings when the sprocket wheel teeth play between the links, of a shoe plate connected to each pair of links and disposed transversely thereacross, and a part on the plate extending into its adjacent shoe pocket formed by the links, transverse members and plate, said part having sloping surfaces adapted to direct foreign matter through the open sides of the links which may be forced between the links by the sprocket wheel.

6. The combination with a traction chain for tractors formed by two series of longitudinally extending pivotally connected links connected by transverse members to form link pockets, said links arranged in pairs and having openings transversely therethrough, a sprocket wheel having teeth to engage the transverse members to drive the chain and force foreign matter through said openings when the sprocket wheel teeth play between the links, two of said teeth working in each link pocket at a time so as to present the gullet space between the teeth adjacent the link openings when the chain is in full driving contact with the sprocket wheel, a shoe secured to each pair of links to complete the aforementioned pockets and comprising a substantially rectangular plate having a lug on its inner face which lug is cone shaped and elliptical in cross section, said lug further having a blunt point that seats in the tooth angle space of the sprocket wheel aforementioned, the sprocket teeth and lug cooperating to cause the foreign matter mentioned to pass through the link openings.

CLIFFORD R. ROGERS.